United States Patent
Kii et al.

(10) Patent No.: US 9,841,004 B2
(45) Date of Patent: Dec. 12, 2017

(54) YAW CONTROL SYSTEM AND YAW CONTROL METHOD FOR WIND TURBINE GENERATOR

(71) Applicant: MITSUBISHI HEAVY INDUSTRIES, LTD., Minato-ku, Tokyo (JP)

(72) Inventors: Tsutomu Kii, Tokyo (JP); Mitsuya Baba, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 665 days.

(21) Appl. No.: 14/293,518

(22) Filed: Jun. 2, 2014

(65) Prior Publication Data
US 2015/0240783 A1    Aug. 27, 2015

(30) Foreign Application Priority Data
Feb. 26, 2014 (JP) ................. 2014-034793

(51) Int. Cl.
F03D 7/02 (2006.01)

(52) U.S. Cl.
CPC .......... *F03D 7/0204* (2013.01); *Y02E 10/723* (2013.01)

(58) Field of Classification Search
CPC ...... F03D 7/0204; F03D 7/0208; F03D 7/043; F03D 7/046
See application file for complete search history.

(56) References Cited

U.S. PATENT DOCUMENTS

| 8,585,363 B2 | 11/2013 | Jeppesen et al. |
| 9,127,645 B2 * | 9/2015 | Bertolotti .............. F03D 7/0204 |
| 2012/0112458 A1 | 5/2012 | Numajiri |

FOREIGN PATENT DOCUMENTS

| JP | H03-99875 U | 10/1991 |
| WO | 2011/092810 A1 | 8/2011 |

* cited by examiner

*Primary Examiner* — Woody Lee, Jr.
*Assistant Examiner* — Sabbir Hasan
(74) *Attorney, Agent, or Firm* — Manabu Kanesaka

(57) ABSTRACT

A yaw control system for a wind turbine generator includes a yaw direction sensor for detecting a yaw direction value of the nacelle at a current time, a yaw rotation amount calculation part for calculating an amount of yaw rotation of the nacelle in a predetermined period of time based on a yaw rotation speed and a yaw rotation time of the nacelle, a yaw direction estimation part for calculating an estimate value of a yaw direction of the nacelle at an end point of the predetermined period by an estimate value calculation logic based on the amount of yaw rotation in the predetermined period calculated by the yaw rotation amount calculation part and the yaw direction value at a starting point of the predetermined period, and a yaw drive control part for controlling the yaw drive mechanism.

8 Claims, 7 Drawing Sheets

YAW CONTROL SYSTEM AND YAW CONTROL METHOD FOR WIND TURBINE GENERATOR

TECHNICAL FIELD

This disclosure relates to a yaw control system for a wind turbine generator configured to generate electrical power by receiving wind energy, and a yaw control method thereof.

BACKGROUND ART

Recently, from the perspective of preserving the environment, a wind turbine generator utilizing wind energy has been attracting attention. The wind turbine generator generally includes a rotor where a plurality of blades is attached to a hub. The rotor is mounted to a nacelle disposed atop a tower provided upright onshore or offshore. In this type of wind turbine generator, the rotor rotates upon receiving wind at the blades, the rotation of the rotor is transmitted to a generator housed in the nacelle, and then electrical power is generated in the generator.

In such a wind turbine generator, the direction of the rotor is normally changed in accordance with the wind direction in order to efficiently convert the wind energy to the rotational energy of the rotor. Thus, there is known a wind turbine generator including a yaw drive mechanism for rotating the nacelle to which the rotor is supported. For instance, Patent Document 1 describes a yaw rotation control method of controlling the yaw direction of the nacelle so that the rotor rotational plane faces the wind direction according to the wind direction deviation between the direction of the nacelle and the actual wind direction.

Further, Patent Document 2 discloses a configuration for stopping the yaw rotation upon detecting that the yaw direction of a wind turbine generator has come out of the operating range with a potentiometer for detecting the yaw direction of a wind turbine generator.

CITATION LIST

Patent Document 1: WO2011/092810
Patent Document 2: JPH3-99875U

SUMMARY OF INVENTION

Technical Problem

However, as described in Patent Document 2, there is an occasion where an accurate value of the yaw direction cannot be detected in a wind turbine generator including a potentiometer when failure, malfunction, etc has occurred for the potentiometer. Performing yaw rotation of the nacelle continuously in the state where the yaw direction value cannot be detected may lead to the various cables, which extend between the tower and the nacelle, being twisted beyond the limit. As a result, there is a possibility of occurrence of serious impracticability which affects the safety of a wind turbine generator, such as damage to or cutoff of the cables.

On the other hand, if the operation of a wind turbine generator is stopped at the point of time when the potentiometer has become abnormal, the operation rate of the wind turbine generator may be considerably decreased in a case where it is difficult to perform maintenance immediately, such as the case where the workers are away from the site during midnight time etc and the case where it is not easy to access the wind turbine generator like the case of an offshore wind turbine.

In this regard, an object of at least some embodiment of the present invention is to provide a yaw control system and a yaw control method for a wind turbine generator, which are capable of obtaining an accurate value of the yaw direction even when the yaw direction sensor is abnormal.

Solution to Problem

A yaw control system for a wind turbine generator according to some embodiment of the present invention, which includes a nacelle configured to be capable of yaw rotation by a yaw drive mechanism, comprises:
a yaw direction sensor for detecting a yaw direction value of the nacelle at a current time;
a yaw rotation amount calculation part for calculating an amount of yaw rotation of the nacelle in a predetermined period of time based on a yaw rotation speed and a yaw rotation time of the nacelle;
a yaw direction estimation part configured to calculate an estimate value of a yaw direction of the nacelle at an end point of the predetermined period by an estimate value calculation logic, based on the amount of yaw rotation in the predetermined period calculated by the yaw rotation amount calculation part and the yaw direction value at a starting point of the predetermined period, and
a yaw drive control part for controlling the yaw drive mechanism,
wherein the yaw drive control part is configured to:
when the yaw direction sensor is normal, determine a yaw rotation direction of the nacelle based on a detected result of the yaw direction value detected by the yaw direction sensor; and
when the yaw direction sensor is abnormal, determine the yaw rotation direction of the nacelle based on the estimate value calculated by the yaw direction estimation part.

In the above yaw control system for a wind turbine generator, the yaw rotation direction of the nacelle is determined by the yaw direction sensor when the yaw direction sensor is normal. In contrast, the yaw rotation direction of the nacelle is determined using an estimate value of the yaw direction calculated by the yaw direction estimation part when the yaw direction sensor is abnormal. Thus, it is possible to determine the appropriate yaw rotation direction of the nacelle using the estimate value of the yaw direction even when the yaw direction value of the nacelle at the current time cannot be accurately detected due to abnormality of the yaw direction sensor such as failure and malfunction. As a result, it is possible to prevent the nacelle from rotating beyond the yaw limit and to prevent the various cables extending between the nacelle and the tower from being twisted beyond the limit, thus enabling safe and continuous operation of the wind turbine generator.

Also, in the yaw direction estimation part, the estimate value of the yaw direction of the nacelle at the end point of the predetermined period is calculated based on the amount of yaw rotation in the predetermined period calculated based on the yaw rotation speed and the yaw rotation time of the nacelle and the yaw direction value at the starting point of the predetermined period. Thus, even for a wind turbine generator with a yaw direction sensor which is not multiplexed, it is possible to use the yaw direction estimation part instead of the yaw direction sensor for obtaining a yaw direction value upon occurrence of trouble or abnormality of the yaw direction sensor, and thus to attain a system with redundancy as if the yaw direction sensor is multiplexed. Accordingly, it is possible to improve safety, reliability, operational rate and the like of operation of the wind turbine generator without requiring cost or space for additionally providing a yaw direction sensor for the purpose of multiplexing.

A yaw control system for a wind turbine generator according to some embodiment further comprises a wind direction sensor for detecting a wind direction of a wind which acts on the wind turbine generator, wherein the yaw drive control part is configured to rotate the nacelle in the yaw rotation direction based on a detected result of the wind direction sensor so that the nacelle follows the wind direction detected by the wind direction sensor.

In the case where the yaw rotation of the nacelle is controlled to follow the wind direction as described above, the yaw rotation direction of the nacelle may tend to either the right or the left depending on how the wind direction changes, raising the possibility of the nacelle rotating beyond the yaw limit. Especially, when abnormality of the yaw direction sensor occurs, the detected result of the yaw direction value cannot be obtained and thus the nacelle may rotate beyond the yaw limit as a result of controlling the nacelle to follow the wind direction.

In this regard, in the yaw control system as described above, the yaw rotation direction is determined based on the estimate value of the yaw direction by the yaw drive control part upon occurrence of abnormality of the yaw direction sensor. Thus, it is possible to avoid the rotation of the nacelle beyond the yaw limit even when the nacelle is controlled to follow the wind direction.

A yaw control system for a wind turbine generator according to some embodiment further comprises a logic correction part configured to correct the estimate value calculation logic in the yaw direction estimation part based on a comparison result between the yaw direction value detected by the yaw direction sensor when the yaw direction sensor is normal and the estimate value of the yaw direction calculated by the yaw direction estimation part when the yaw direction sensor is normal.

The estimate value of the yaw direction obtained by the yaw direction estimation part may include an integration error caused by individual differences or aging of the yaw drive mechanism. Thus, it is possible to improve the accuracy in estimating the yaw direction in the yaw direction estimation part by correcting the estimate value calculation logic of the yaw direction estimation part by using the detected result of the yaw direction sensor obtained when the yaw direction sensor is normal as described above. As a result, it is possible to determine the yaw rotation direction of the nacelle based on an accurate estimate value of the yaw direction calculated by the yaw direction estimation part upon occurrence of abnormality of the yaw direction sensor.

In one embodiment, the yaw direction estimation part is configured to calculate the estimate value of the yaw direction from a correlation of the yaw direction value at the end point of the predetermined period to the yaw direction value at the starting point of the predetermined period and the amount of yaw rotation in the predetermined period, and the logic correction part is configured to correct the correlation based on the comparison result.

As a result, it is possible to attain the appropriate estimate value calculation logic by correcting the correlation and thus to improve the estimation accuracy of the yaw direction in the yaw direction estimation part.

In some embodiment, the yaw direction estimation part is configured to calculate the estimate value of the yaw direction from a correlation of the yaw direction value at the end point of the predetermined period to the yaw direction value at the starting point of the predetermined period and the amount of yaw rotation in the predetermined period, and the correlation is set for each yaw rotation direction of the nacelle.

As described above, the correlation is set for each of the yaw rotations to the right and to the left. As a result, even in the case where the characteristics of the yaw drive mechanism are varied between the yaw rotations to the right and to the left for instance, it is possible to calculate the appropriate estimate value of the yaw direction according to the yaw rotation direction.

The yaw control system for a wind turbine generator according to some embodiment further comprises an estimate value correction part for correcting the estimate value calculated by the yaw direction estimation part when the yaw direction sensor is abnormal, wherein the estimate value correction part is configured to correct the estimate value based on a reference yaw direction value detected by a normal yaw direction sensor of another wind turbine generator which is under wind conditions similar to the wind turbine generator.

Normally, the yaw drive control part controls the yaw rotation of the nacelle according to the wind conditions such as the wind direction detected by the wind direction sensor, for instance. Thus, a plurality of wind turbine generators each of which is under the wind conditions similar to those of one another can be considered to have performed substantially same amount of yaw rotation. Therefore, by correcting the estimate value of the yaw direction of the wind turbine generator based on a reference yaw direction value detected by the normal yaw direction sensor provided for another wind turbine generator which has a similarity of the wind conditions, it is possible to calculate an accurate estimate value of the yaw direction.

In one embodiment, the estimate value correction part is configured to correct the estimate value based on the reference yaw direction value once a difference between: an amount of change of the estimate value of the yaw direction calculated by the yaw direction estimation part in a set period; and an amount of change of the reference yaw direction value in the set period exceeds a threshold value.

In the above embodiment, when the difference between the amount of change of the estimate value of the yaw direction of said wind turbine generator and the amount of change of the reference yaw direction value of the other wind turbine generator has exceeded the threshold value, there is a possibility that the error in the estimate yaw direction value of said wind turbine generator is excessive. Thus, the estimate value is corrected based on the reference yaw direction value. As a result, it is possible to prevent the estimate yaw direction value from departing considerably from the actual yaw direction value and thus to improve the estimation accuracy.

A yaw controlling method according to some embodiment of the present invention is for a wind turbine generator including a nacelle configured to be capable of yaw rotation by a yaw drive mechanism, and comprises:

a yaw direction detection step of detecting a yaw direction value of the nacelle at a current time with a yaw direction sensor;

a yaw rotation amount calculation step of calculating an amount of yaw rotation of the nacelle in a predetermined period of time based on a yaw rotation speed and a yaw rotation time of the nacelle;

a yaw direction estimation step of calculating an estimate value of a yaw direction of the nacelle at an end point of the predetermined period by an estimate value calculation logic, based on the amount of yaw rotation in the predetermined period calculated in the yaw rotation amount calculation step and the yaw direction value at a starting point of the predetermined period; and a yaw drive control step for controlling the yaw drive mechanism, wherein, in the yaw drive control step:

when the yaw direction sensor is normal, a yaw rotation direction of the nacelle is determined based on a detected result of the yaw direction value detected in the yaw direction detection step; and when the yaw direction sensor is abnormal, the yaw rotation direction of the nacelle is determined based on the estimate value calculated in the yaw direction estimation step.

According to the above yaw controlling method for a wind turbine generator, in the yaw drive control step, the yaw rotation direction of the nacelle is determined using the yaw direction sensor when the yaw direction sensor is normal. On the other hand, the yaw rotation direction of the nacelle is determined using the estimate value of the yaw direction calculated by the yaw direction estimation step when abnormality of the yaw direction sensor has occurred. Thus, even when the yaw direction value of the nacelle at the current time cannot be detected accurately, it is possible to determine the appropriate yaw rotation direction of the nacelle by using the estimate value of the yaw direction. As a result, it is possible to prevent the nacelle from rotating beyond the yaw limit and to prevent the various cables extending between the nacelle and the tower from being twisted beyond the limit, thus enabling safe and continuous operation of the wind turbine generator.

Also, in the yaw direction estimation step, the estimate value of the yaw direction of the nacelle at the end point of the predetermined period is calculated based on the amount of yaw rotation in the predetermined period calculated based on the yaw rotation speed and the yaw rotation time of the nacelle and the yaw direction value at the starting point of the predetermined period. Thus, even for a wind turbine generator with a yaw direction sensor which is not multiplexed, it is possible obtain a yaw direction value sensor without using the yaw direction sensor upon occurrence of trouble or abnormality of the yaw direction in the yaw direction estimation step, thus attaining a system with redundancy as if the yaw direction sensor is multiplexed. Accordingly, it is possible to improve safety, reliability, operational rate and the like of operation of the wind turbine generator without requiring cost or space for additionally providing a yaw direction sensor for the purpose of multiplexing.

Advantageous Effects

According to one embodiment of the present invention, even when the yaw direction value of the nacelle at the current time cannot be detected accurately, it is possible to determine the appropriate yaw rotation direction of the nacelle by using the estimate value of the yaw direction. As a result, it is possible to prevent the nacelle from rotating beyond the yaw limit and to prevent the various cables extending between the nacelle and the tower from being twisted beyond the limit, thus enabling safe and continuous operation of the wind turbine generator Also, even for a wind turbine generator with a yaw direction sensor which is not multiplexed, it is possible to use the yaw direction estimation part instead of the yaw direction sensor for obtaining a yaw direction value upon occurrence of trouble or abnormality of the yaw direction sensor, attaining a system with redundancy as if the yaw direction sensor is multiplexed. Accordingly, it is possible to improve safety, reliability, operational rate and the like of operation of the wind turbine generator without requiring cost or space for additionally providing a yaw direction sensor for the purpose of multiplexing.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
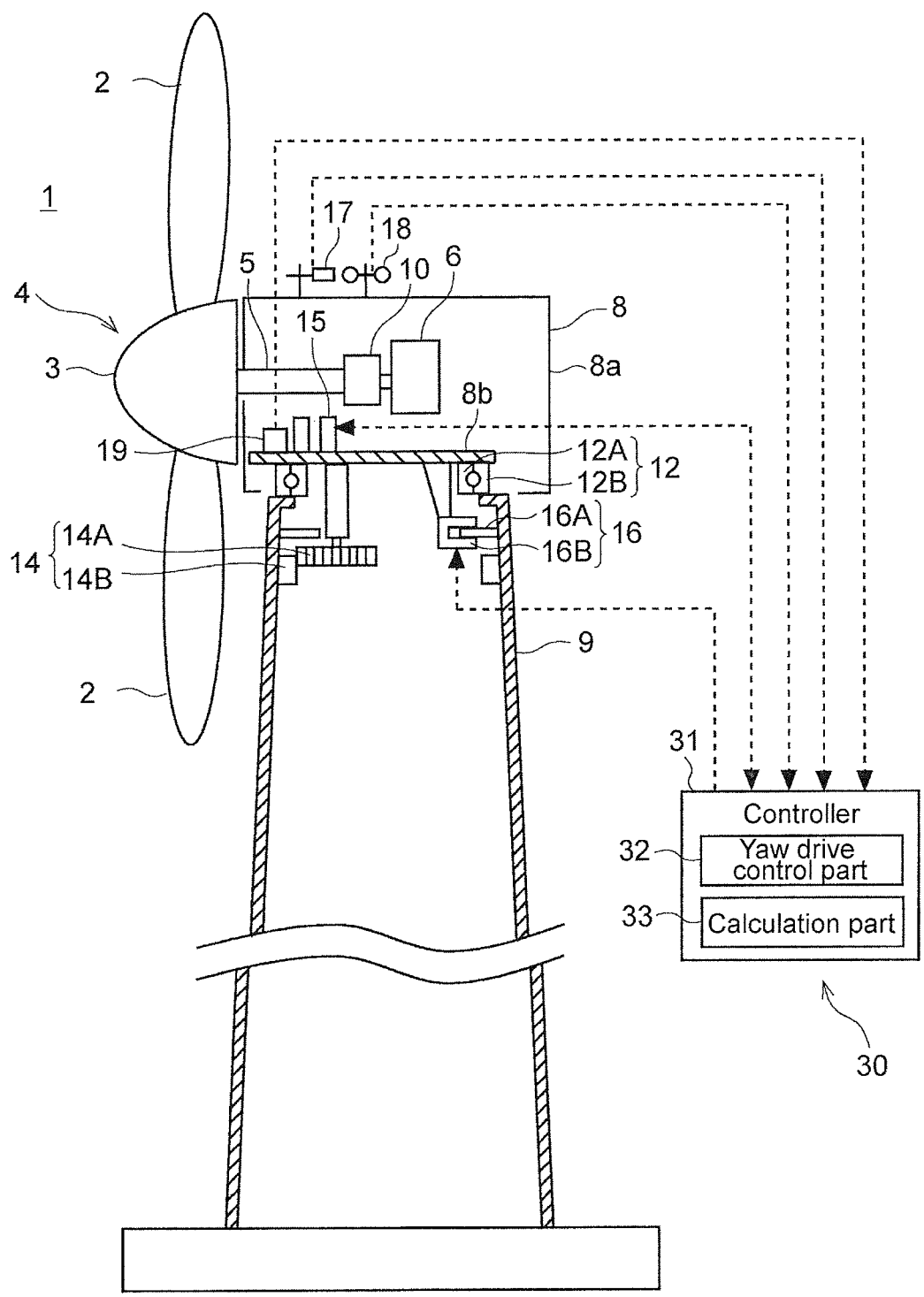
FIG. 1 is a side view of the schematic overall configuration of a wind turbine generator according to one embodiment.

First, in reference to FIG. 1, the exemplary configuration of a wind turbine generator 1 and a yaw control system 30 according to the embodiment of the present invention will be described. FIG. 1 is a side view of the schematic overall configuration of the wind turbine generator 1 according to one embodiment.

In some embodiment, the wind turbine generator 1 shown in FIG. 1 has a rotor 4 including at least two blades 2 and a hub 3, the rotor being configured to be rotated by wind energy. The hub 3 may be formed integrally by casting and has attachment parts for the blades 2. For instance, the wind turbine generator 1 may include three blades 2 attached radially to the hub 3. The hub 3 may be covered by a hub cover (not shown). Also, the wind turbine generator 1 includes a generator 6 configured to generate electrical power using rotation energy of the rotor 4. The rotation energy of the rotor 4 may be transmitted to the rotor 4 via the drive train 10. In this case, a gear box or a hydraulic transmission including a hydraulic pump and a hydraulic motor may be used as the drive train 10. Also, the hub 3 and the generator 6 may be connected directly with each other without providing the drive train 10.

As shown in FIG. 1, a tower 9 is provided standing upright onshore or offshore. A nacelle 8 includes a nacelle base plate 8b attached to an upper end of the tower 9 and a nacelle cover 8a supported by the nacelle base plate 8b and configured to cover the equipments disposed in the interior space of the nacelle 8. The nacelle base plate 8b is supported rotatably on an upper part of the tower 9 via a yaw rotation bearing 12. Specifically, the yaw rotation bearing 12 includes an inner race 12A and an outer race 12B. The inner race 12A is attached to the nacelle base plate 8b while the outer race 12B is attached to the tower 9. The yaw rotation bearing 12 allows the nacelle 8 including the nacelle base plate 8b to be rotatable in the yaw direction with respect to the tower 9.

In one embodiment, the wind turbine generator 1 shown in FIG. 1 includes a nacelle rotation mechanism 14 and a yaw drive mechanism 15 for rotating the nacelle 8, and a yaw brake 16 for stopping the yaw rotation of the nacelle 8.

The nacelle rotation mechanism 14 includes, for instance, a gear 14A configured to be rotated by the yaw drive mechanism 15 disposed on the nacelle base plate 8b, and an internal gear 14B which is provided on the inner circumferential face of the upper part of the tower 9 and which engages with the gear 14A. As another exemplary configuration, the nacelle rotation mechanism 14 may include an external gear provided on the outer circumferential side of the tower 9 and a gear configured to engage with the external gear.

The yaw drive mechanism 15 is, for instance, attached to the nacelle base plate 8b and may include: a reducer connected directly to the shaft of the gear 14A directly or connected to the gear 14A via a pinion; a clutch; a yaw motor; an electromagnetic brake; and a housing which houses the above. With the above configuration, in response to the electromagnetic brake being switched on in the state the clutch is engaged, the driving force of the yaw motor is transmitted to the gear 14A via the reducer, and the gear 14A rotates in engagement with the internal gear 14B. As a result, the nacelle 8 performs yaw rotation with respect to the tower 9. Herein, a plurality of the yaw drive mechanism 15 may be provided on the circumference centered at the axis of the tower 9. In another exemplary configuration, the yaw drive mechanism 15 may be attached to the upper part of the tower 9.

In one embodiment, the wind turbine generator 1 further includes a yaw control system 30 for controlling yaw rotation of the nacelle 8. The yaw control system 30 includes a group of sensors including a wind direction sensor 17, a wind velocity sensor 18, and a potentiometer 20, and a central monitoring controller (SCADA) 31 for performing yaw control based on the detected signal from the group of sensors. The configuration of the central monitoring controller 31 will be described below.

Figure 2:
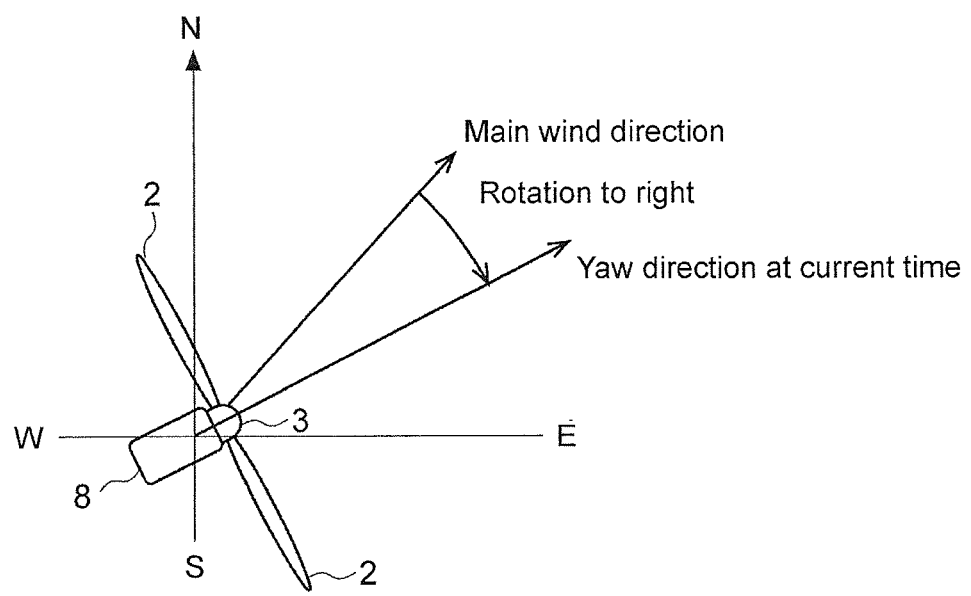
FIG. 2 is an explanatory diagram of the yaw rotation of the nacelle according to one embodiment.

The wind direction sensor 17 detects the direction of the main wind direction with respect to the direction of the wind turbine rotor 4 as shown in FIG. 2. The wind direction sensor 17 may be configured to detect the deviation between the nacelle 8 and the wind direction. Herein, FIG. 2 is an explanatory diagram of the yaw rotation of the nacelle according to one embodiment. Generally, for the wind turbine generator 1, the control for rotating the nacelle 8 is performed so that the nacelle 8 follows the wind direction detected by the wind direction sensor 20 (the main wind direction), based on the detected result of the wind direction sensor 17.

Referring back to FIG. 1, the wind velocity sensor 18 is configured to detect the wind velocity at the wind turbine rotor or the nacelle.

The potentiometer 20 may include a yaw direction sensor 19 and a yaw limit sensor 21. The yaw direction sensor 19 is configured to detect the yaw direction value of the nacelle at the current time. For instance, the yaw direction sensor 19 may be configured to detect the relative amount of yaw rotation between the tower 9 and the nacelle 8. Herein, the yaw direction value detected by the yaw direction sensor 19 is indicated by a rotation angle with respect to the reference direction and may be a relative angle with respect to the reference direction. In this case, even when the nacelle 8 faces the same direction, the yaw direction value may be different by 360n degrees, n being an integer.

Figure 3:
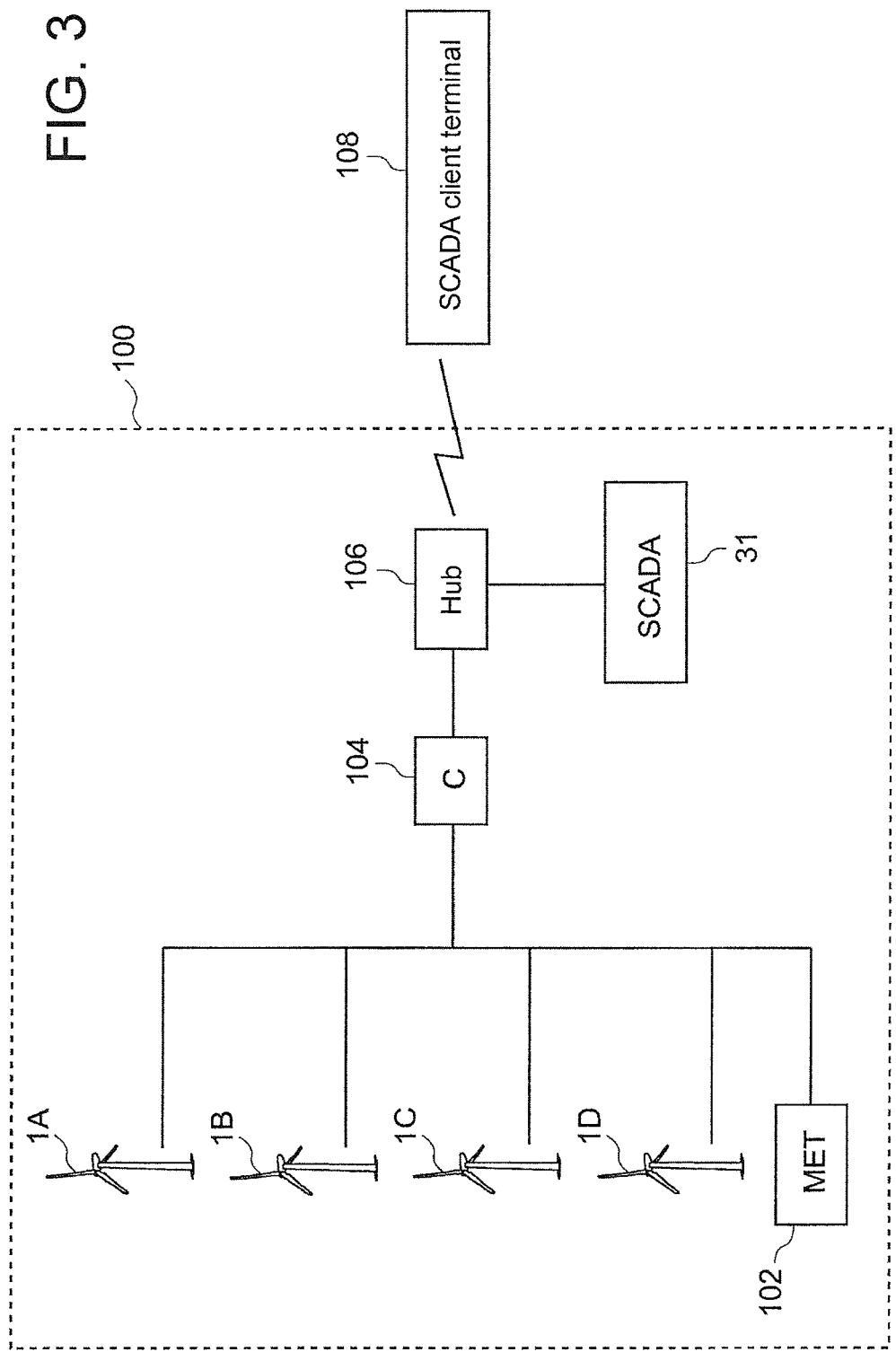
FIG. 3 is a diagram of an exemplary configuration of a wind farm according to one embodiment.

As shown in FIG. 3, in one embodiment, the yaw control system 30 may be employed for a wind farm 100 where a plurality of wind turbine generators 1 (1A to 1D) are provided.

The wind farm 100 is provided on the ocean or on the ground. The plurality of wind turbine generators 1 (1A to 1D) is connected communicably to the central monitoring controller 31 via the communication line including the communication converter 104, the hub 106, LAN, and the like. Also, for the wind farm 100, a wind condition monitoring device (MET) 102 may be provided. The MET 102 is provided in the wind farm 100 singularly or plurally for observing the wind conditions such as the wind direction and the wind velocity in the wind farm 100. Similarly to the wind turbine generator 1, the MET 102 is connected communicably to the central monitoring controller 31 via the communication line including the communication converter 104, the hub 106, LAN, and the like. Further, the plurality of wind turbine generators 1 (1A to 1D), the MET 102 or the central monitoring controller 31 may be capable of being connected to a SCADA client terminal 108 via the communication line such as the Internet. The central monitoring controller 31 obtains the operation conditions of each wind turbine generator 1 (1A to 1D) or the detection signals of the various sensors of the wind turbine generator 1, obtains the wind conditions in the wind farm 100 from the MET 102, obtains a variety of control signals from each wind turbine generator 1 (1A to 1D) etc, via the communication line. Also, the SCADA client terminal 108 is provided outside the wind farm 100 and configured to be communicable to, via the communication line such as the Internet, the various apparatuses inside the wind farm 100 such as the central monitoring controller 31, the MET 102, and each wind turbine generators 1A to 1D, for instance. This SCADA client terminal 108 is, for instance, used for inputting commands from the client, monitoring the state of each wind turbine generator 1 (1A to 1D), etc.

Figure 4:
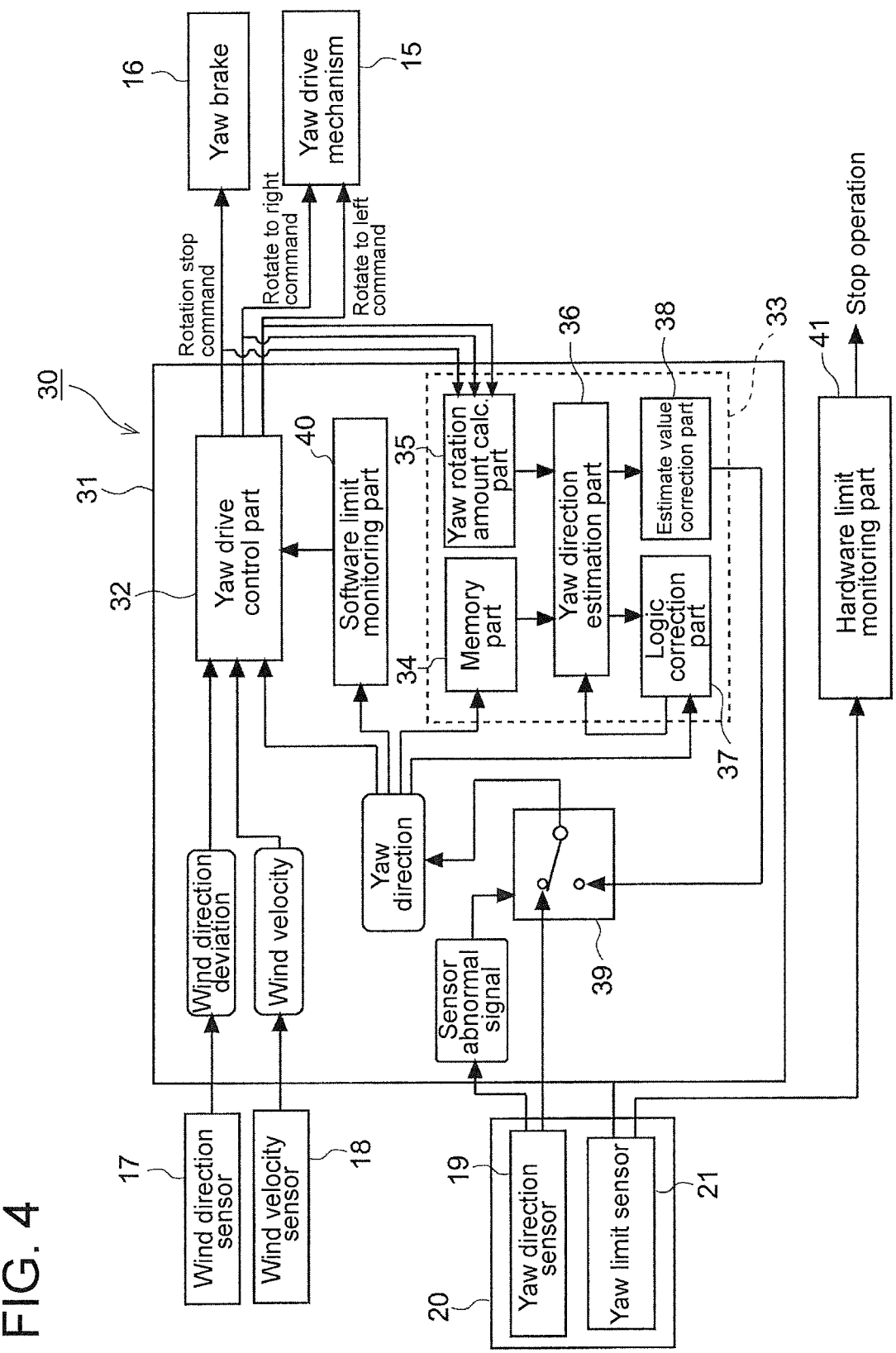
FIG. 4 is a configuration diagram of the yaw control system of a wind turbine generator according to one embodiment.

As shown in FIG. 4, in the yaw control system 30 according to some embodiment, the central monitoring controller 31 is configured to output to the yaw brake 16 or the yaw drive mechanism 15 the control signals calculated by the sensor detection signals being inputted from the wind direction sensor 17, the wind velocity sensor 18, and the potentiometer 20, and by performing various calculations. For instance, the central monitoring controller 31 includes a CPU (Central Processing Unit), a RAM (Random Access Memory) and a storage medium readable by a computer, and the like, not shown in the drawing. The storage medium and the like store, in the form of program, the procedures of the series of processes for attaining the various functions described below. This program is retrieved by the CPU to the RAM and the like, and then the processing and calculating is performed on the information, whereby the various functions described below are attained.

Specifically, the central monitoring controller 31 mainly includes a yaw drive control part 32 for controlling the yaw drive mechanism and a calculation part 33 for performing calculation related to the estimate yaw direction value. The calculation part 33 may include a memory part 34, a yaw rotation amount calculation part 35, a yaw direction estimation part 36, a logic correction part 37, and an estimate value correction part 38.

The yaw drive control part 32 is configured to control the yaw drive mechanism 15. That is, the yaw drive control part 32 is configured to calculate the control signal for rotating the nacelle 8 based on the detected result of the wind direction sensor 17 and the wind velocity sensor 18. For instance, the yaw drive control part 32 is configured to rotate the nacelle 8 so that the nacelle 8 follows the wind direction detected by the wind direction sensor 17. That is, the target value of the yaw direction of the nacelle 8 is determined by the wind direction sensor 17 and the wind velocity sensor 18. Then, the yaw drive control part 32 outputs a command to stop rotation for the yaw brake 16, outputs a command to rotate to the right or to the left for the yaw drive mechanism 15, etc.

Herein, when rotating the nacelle 8 to the target value of the yaw direction, it is possible to select two kinds of rotation directions, namely rotation to the right and rotation to the left. In the present embodiment, the manner of rotation of the nacelle 8 is determined by the yaw drive control part 32 as described below. In the present embodiment, "rotation to the right" refers to the clockwise direction of yaw rotation and "rotation to the left" refers to the counterclockwise direction of yaw rotation as the nacelle 8 is viewed from above the wind turbine generator 1.

Specifically, when the yaw direction sensor 19 is normal, the yaw drive control part 32 determines the yaw rotation direction of the nacelle 8 so that the yaw direction value detected by the yaw direction sensor 19 falls within the predetermined range (yaw limit). For instance, when the yaw direction sensor 19 is normal, within the range of the yaw limit, such a direction is selected for the yaw rotation direction of the nacelle 8 that requires a smaller amount of yaw rotation (rotation angle) for rotating from the current angle to the target angle, from the perspective of improving efficiency. On the other hand, when the yaw direction sensor is normal and the target angle is beyond the yaw limit, such a direction is selected that requires a larger amount of yaw rotation for rotating from the current angle to the target angle, that is, such a direction that reduces the yaw direction value of the nacelle 8. Herein, a yaw limit is a threshold value which indicates the boundary of the predetermined range in which the rotation of the nacelle 8 is allowed. As long as the yaw rotation is performed within the range of the yaw limit, it is possible to avoid occurrence of troubles caused by the various cables and the like extending between the nacelle 8 and the tower 9 being twisted excessively. Also, as described below, in the case where a software limit monitoring part 40 and a hardware limit monitoring part 41 are provided for monitoring the limit of the yaw rotation, the yaw limit includes a software limit used in the software limit monitoring part 40 and a hardware limit used in the hardware limit monitoring part 41. In this case, the software limit is used as the yaw limit in the above described yaw drive control part 32.

Further, when abnormality of the yaw direction sensor 19 has occurred, the yaw drive control part 32 is configured to determine the yaw rotation direction of the nacelle 8 so that the estimate value calculated by the yaw direction estimation part 36 falls within the predetermined range. On the other hand, when abnormality of the yaw direction sensor 19 has occurred and the target angle is beyond the predetermined range (yaw limit), the yaw drive control part 32 selects a yaw rotation direction such that the yaw direction value of the nacelle 8 becomes smaller. The estimation method of the yaw direction estimation part 36 will be described later.

The memory part 34 includes, for instance, a non-volatility memory and stores a yaw direction value detected by the yaw direction sensor 19, an estimate yaw direction value calculated by the yaw direction estimation part 36, etc.

The yaw rotation amount calculation part 35 is configured to calculate the amount of yaw rotation of the nacelle 8 in a predetermined period of time based on the yaw rotation speed and the yaw rotation time of the nacelle 8. For instance, the amount of yaw rotation is calculated as a product of the yaw rotation speed and the yaw rotation time. Herein, the yaw rotation speed may be obtained from the specifications of the yaw drive mechanism (for instance, the specifications of the yaw motor) or from the sensor for detecting the yaw rotation speed.

The yaw direction estimation part 36 is configured to calculate an estimate value of the yaw direction of the nacelle 8 at the end point of the predetermined period by an estimate value calculation logic, based on the amount of the yaw rotation in the predetermined period calculated by the yaw rotation amount calculation part 35 and the yaw direction value at the starting point of the predetermined period. Herein, the estimate value calculation logic includes a correlation in which a variable is set in advance. Specifically, the correlation is an equation for the correlation of the yaw direction value at the end point of the predetermined period to the yaw direction value at the starting point of the predetermined period and the amount of yaw rotation in the predetermined period. This correlation is set for each of the yaw rotation directions of the nacelle 8. Since this correlation is set corresponding to each of the yaw rotation to the right and the yaw rotation to the left, even in the case where the yaw drive mechanism 15 has characteristics varied between the yaw rotation to the right and the yaw rotation to the left for instance, it is possible to calculate the appropriate estimate value of the yaw direction according to the yaw rotation direction. The estimate yaw direction value, calculated as described above, is stored in the memory part 34, inputted to the yaw rotation control part 32, etc, instead of a yaw direction value detected by the yaw direction sensor 19 when the yaw direction sensor 19 is abnormal. Herein, a switch 39 may be used to switch between the yaw direction value detected by the yaw direction sensor 19 and the estimate yaw direction value calculated by the yaw direction estimation part 36. Upon determination of abnormality of the yaw direction sensor 19, it may be determined that abnormality of the yaw direction sensor has occurred in response to a sensor abnormality signal being received by the yaw direction sensor 19. Also, for instance, when a mechanical part (hardware) of the yaw direction sensor 19 breaks down, the output signal of the yaw direction sensor 19 no longer changes. Thus, when the output signal of the yaw direction sensor 19 does not change for a certain period of time, it may be determined that abnormality of the yaw direction sensor 19 has occurred.

In the yaw control system 30 having the above configuration, the yaw drive control part 32 is configured to determine the yaw rotation direction of the nacelle 8 based on a detected result of the yaw direction value obtained by the yaw direction sensor 19 when the yaw direction sensor 19 is normal. On the other hand, the yaw drive control part 32 is configured to determine the yaw rotation direction of the nacelle 8 based on the estimate value calculated by the yaw direction estimation part 36 when abnormality of the yaw direction sensor 19 has occurred. Thus, even when the yaw direction value at the current time of the nacelle 8 cannot be detected accurately due to abnormality of the yaw direction sensor 19 such as failure and malfunction, it is possible to determine the appropriate yaw rotation direction of the nacelle 8 by using the estimate value of the yaw direction. As a result, it is possible to prevent the nacelle 8 from rotating beyond the yaw limit and to prevent the various cables extending between the nacelle 8 and the tower 9 from being twisted beyond the limit, thus enabling safe and continuous operation of the wind turbine generator 1.

Also, in the yaw direction estimation part 36, the estimate value of the yaw direction of the nacelle at the end point of the predetermined period is calculated based on the amount of yaw rotation in the predetermined period calculated based on the yaw rotation speed and the yaw rotation time of the nacelle and the yaw direction value at the starting point of the predetermined period. Thus, even for a wind turbine generator 1 with a yaw direction sensor 19 which is not multiplexed, it is possible to use the yaw direction estimation part 36 instead of the yaw direction sensor 19 for obtaining the yaw direction value upon occurrence of trouble or abnormality of the yaw direction sensor 19, and thus to attain a system with redundancy as if the yaw direction sensor 19 is multiplexed. Accordingly, it is possible to improve safety, reliability, operational rate and the like of operation of the wind turbine generator 1 without requiring cost or space for additionally providing a yaw direction sensor for the purpose of multiplexing.

Moreover, in the yaw control system 30 having the above configuration, the yaw drive control part 32 is configured to determine the yaw rotation direction based on the estimate value of the yaw direction when abnormality of the yaw direction sensor 19 has occurred as described above. Thus, it is possible to avoid the yaw rotation of the nacelle 8 beyond the yaw limit even when the nacelle 8 is controlled to follow the wind direction.

In one embodiment, the yaw control system 30 may further comprise a logic correction part 37. The logic correction part 37 is included in the calculation part 33 and configured to correct the estimate value calculation logic in the yaw direction estimation part 36 based on a comparison result between: the yaw direction value detected by the yaw direction sensor 19 when the yaw direction sensor 19 is normal; and the estimate value of the yaw direction calculated by the yaw direction estimation part 36 when the yaw direction sensor is normal. The estimate value of the yaw direction obtained by the yaw direction estimation part 36 occasionally includes an integration error caused by individual difference or aging of the yaw drive mechanism 15. Thus, it is possible to improve the estimation accuracy of the yaw direction in the yaw direction estimation part 36 by correcting the estimate value calculation logic of the yaw direction estimation part 36 by using the detected result of the yaw direction sensor 19 obtained when the yaw direction sensor 19 is normal as described above. As a result, it is possible to determine the yaw rotation direction of the nacelle 8 based on an accurate estimate value of the yaw direction calculated by the yaw direction estimation part 36 upon occurrence of abnormality of the yaw direction sensor 19.

In one embodiment, the yaw direction estimation part 36 is configured to calculate the estimate value of the yaw direction from a correlation of the yaw direction value at the end point of the predetermined period to the yaw direction value at the starting point of the predetermined period and the amount of yaw rotation in the predetermined period. Also, the logic correction part is configured to correct the correlation based on the comparison result. In this case, the logic correction part may be configured to correct the correlation based on the comparison result. In this configuration, the estimate value calculation logic includes a correlation of the yaw direction value at the end point of the predetermined period to the yaw direction value at the starting point of the predetermined period and the amount of yaw rotation in the predetermined period, while the logic correction part 37 is configured to correct this correlation. As a result, it is possible to attain the appropriate estimate value calculation logic by correcting the correlation and thus to improve the estimation accuracy of the yaw direction value in the yaw direction estimation part 36.

In one embodiment, the yaw control system 30 further includes an estimate value correction part 38 for correcting the estimate value calculated by the yaw direction estimation part when abnormality of the yaw direction sensor has occurred. The estimate value correction part 38 is configured to correct the estimate yaw direction value based on a reference yaw direction value detected by a normal yaw direction sensor of another wind turbine generator which is under the wind conditions similar to said wind turbine generator 1. Normally, the yaw drive control part 32 controls the yaw rotation of the nacelle 8 according to the wind conditions, such as the wind direction detected by the wind direction sensor 17 for instance. Thus, a plurality of wind turbine generators 1 each of which is under the wind conditions similar to those of one another can be considered to have performed substantially same amount of yaw rotation. Herein, by correcting the estimate value of the yaw direction of said wind turbine generator 1 based on the reference yaw direction value detected by the normal yaw direction sensor 19 provided for another wind turbine generator which has a similarity of wind conditions, it is possible to calculate an accurate estimate value of the yaw direction. For instance, in the wind farm 100 as shown in FIG. 3 described above, the nearby wind turbine generators 1B, 1C, etc can be selected as the wind turbine generators having the similarity of wind conditions with said wind turbine generator 1 when abnormality of the yaw direction sensor 19 has occurred in the wind turbine generator 1A. When the yaw direction sensor 19 of the other wind turbine generators 1B or 1C is normal, the estimate yaw direction value may be corrected based on the reference yaw direction value detected by the wind turbine generators 1B or 1C.

In the above embodiment, the estimate value correction part 38 may be configured to correct the estimate value based on the reference yaw direction value once a difference between: an amount of change of the estimate yaw direction value calculated by the yaw direction estimation part 36 in a set period; and an amount of change of the reference yaw direction value in the set period exceeds a threshold value. When the difference between the amount of change of the estimate yaw direction value of said wind turbine generator 1 and the amount of change of the reference yaw direction value of the other wind turbine generator has exceeded the threshold value, there is a possibility that the error in the estimate yaw direction value of said wind turbine generator is excessive. Thus, the estimate value is corrected based on the reference yaw direction value. As a result, it is possible to prevent the estimate yaw direction value from departing considerably from the actual yaw direction value and thus to improve the estimation accuracy.

Further, in one embodiment, the yaw control system 30 may include a software limit monitoring part 40 included in the central monitoring controller 31 and a hardware limit monitoring part 41 provided separately from the central monitoring controller 31.

The software monitoring part 40 is configured to monitor the yaw direction value detected by the yaw direction sensor 19 so that it does not exceed the software limit when the yaw direction sensor 19 is normal. That is, when the yaw direction value exceeds the software limit, the software limit monitoring part 40 sends a command to the yaw drive control part 32 to take a yaw rotation direction such that the yaw direction value does not exceed the software limit. When the yaw direction sensor 19 is abnormal, the software limit monitoring part 40 is configured to monitor the estimate yaw direction value calculated by the yaw direction estimation part 36 so that it does not exceed the software limit. That is, when the estimate yaw direction value exceeds the software limit, the software limit monitoring part 40 sends a command to the yaw drive control part 32 to take a yaw rotation direction such that the yaw direction value does not exceed the software limit.

The hardware limit monitoring part 41 is configured to monitor the yaw direction value detected by the yaw direction sensor 19 so that it does not exceed the hardware limit when the yaw direction sensor 19 is normal. That is, when the yaw direction value exceeds the hardware limit, the hardware limit monitoring part 41 performs the control to stop operation of the wind turbine generator 1. At this time, the auxiliary machines of the wind turbine generator 1 may be shut down. When the yaw direction sensor 19 is abnormal, the hardware limit monitoring part 41 is configured to monitor the estimate yaw direction value calculated by the yaw direction estimation part 36 so that it does not exceed the hardware limit. That is, when the estimate yaw direction value exceeds the hardware limit, the hardware limit monitoring part 41 performs the control to stop operation of the wind turbine generator 1. At this time, the auxiliary machines of the wind turbine generator 1 may be shut down.

Normally, the hardware limit is set under conditions more severe than those of the software limit. For instance, the software limit is ±270 degrees, which is the tolerant range of the yaw rotation, while the hardware limit is ±720 degrees, which is the angle limit of twisting. Herein, "+" refers to the yaw rotation to the right, and "−" refers to the yaw rotation to the left.

Hereinafter, the procedures will be described in detail of the yaw control method of the wind turbine generator 1 according to the embodiment of the present invention.

While the wind turbine generator 1 of upwind type will be described as an example of the wind turbine generator, the yaw control method according to the embodiment of the present invention may be adopted for other wind turbine generators such as that of downwind type.

First, in the yaw direction detection step, the yaw direction value of the nacelle 8 at the current time is detected by the yaw direction sensor 19. The detection of the yaw direction by the yaw direction sensor 19 may be performed continuously, or cyclically at the predetermined interval.

Next, in the yaw rotation amount calculation step, the amount of yaw rotation of the nacelle 8 in a predetermined period of time is calculated based on the yaw rotation speed and the yaw rotation time of the nacelle 8.

Further, in the yaw direction estimation step, the estimate value of the yaw direction of the nacelle at the end point of the predetermined period is calculated by the estimate value calculation logic based on the amount of yaw rotation in the predetermined period calculated in the yaw rotation amount calculation step and the yaw direction value at the starting point of the predetermined period. Herein, the estimate value calculation logic includes a correlation where a variable is set in advance. Specifically, the correlation is an equation for the correlation of the yaw direction value at the end point of the predetermined period to the yaw direction value at the starting point of the predetermined period and the amount of yaw rotation in the predetermined period. This correlation is set for each yaw rotation direction of the nacelle 8. Since this correlation is set corresponding to each of the yaw rotations to the right and to the left as described above, it is possible to calculate the appropriate estimate value of the yaw direction according to the yaw rotation direction.

In the yaw drive control step, as a basic operation, the nacelle 8 is rotated in such a yaw rotation direction that the nacelle 8 follows the wind direction detected by the wind direction sensor based on the detected result of the wind direction sensor 17. In addition to this, in the yaw drive control step, the yaw rotation direction of the nacelle is determined so that the yaw direction value detected in the yaw direction detection step falls within the predetermined range when the yaw direction sensor 19 is normal, while the yaw rotation direction of the nacelle is determined so that the estimate value calculated in the yaw direction estimation step falls within the predetermined range when abnormality of the yaw direction sensor 19 has occurred.

Figure 5:
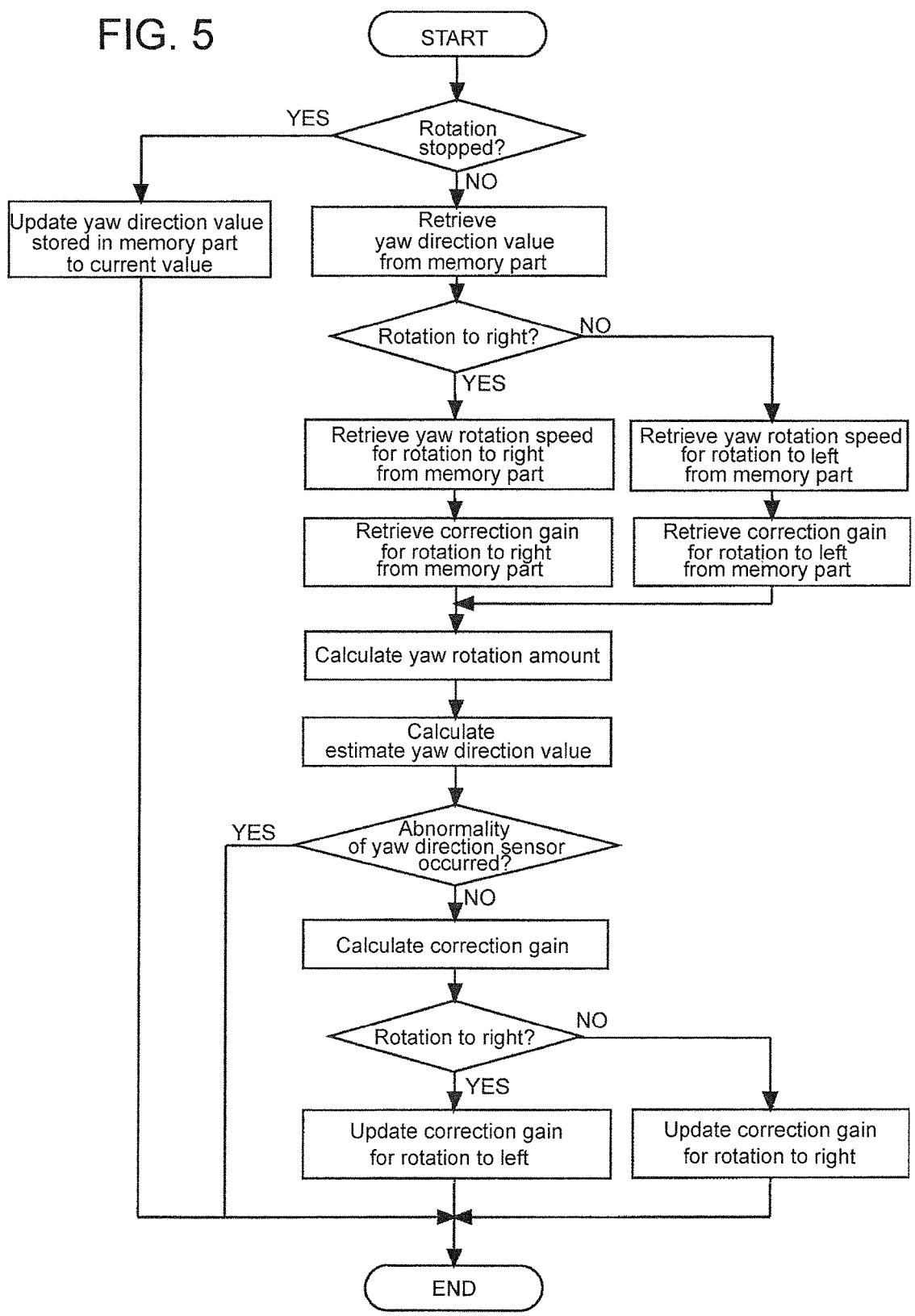
FIG. 5 is a flow chart of the procedures for calculating the estimate yaw direction value in the yaw control system of a wind turbine generator according to one embodiment.

Subsequently, in reference to FIGS. 5 to 7, the specific yaw control method will be described. FIG. 5 is a flow chart of the procedures for calculating the estimate yaw direction value in the yaw control system of a wind turbine generator according to one embodiment.

Figure 6:
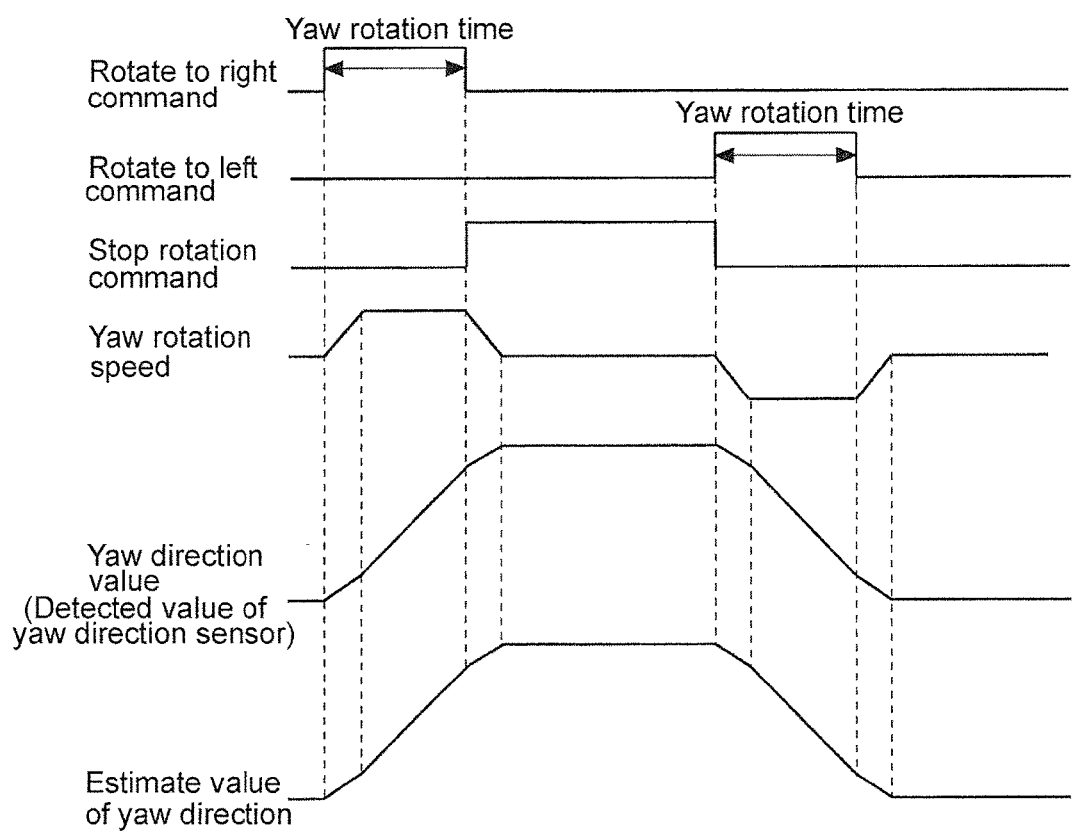
FIG. 6 is a time chart of each command signal and sensor detection signal of a wind turbine generator according to one embodiment.

FIG. 6 is a time chart of each command signal and sensor detection signal of a wind turbine generator according to one embodiment. FIG. 7 is a flow chart of the procedures for calculating the estimate yaw direction value in the yaw control system of a wind turbine generator according to another embodiment.

In FIG. 5, at first, it is determined whether yaw rotation of the nacelle 8 of the wind turbine generator 1 is stopped. When yaw rotation of the nacelle 8 is stopped, the yaw direction value previously stored in the memory part 34 is updated to the yaw direction value (or the estimate yaw direction value) just obtained by the yaw direction sensor 19 or the yaw direction estimation part 36. On the other hand, when the nacelle 8 is rotating, the yaw direction stored in the memory part 34 is retrieved. At this time, it is determined whether the nacelle 8 is rotating to the right. When rotating to the right, the yaw rotation speed for the yaw rotation to the right is retrieved from the memory part 34, and then the correction gain for the yaw rotation to the right is retrieved from the memory part 34. Then, in the yaw rotation amount calculation step, the amount of yaw rotation is calculated. For instance, the amount of yaw rotation is calculated as a product of the yaw rotation speed for rotation to the right and the yaw rotation time for rotation to the right. Then, in the yaw direction estimation step, the estimate value of the yaw direction is calculated. For instance, the estimate value of the yaw direction is calculated by adding the amount of yaw rotation to the yaw direction value which has been retrieved from the memory part 34, and then multiplying the sum of the above addition by the correction gain for rotation to the right. Herein, when the nacelle 8 is not rotating to the right, that is, when the nacelle 8 is rotating to the left, the estimate value of the yaw direction is calculated using the yaw rotation speed for rotation to the left and the correction gain for rotation to the left by the procedures similar to the above.

Herein, it is determined whether abnormality of the yaw direction sensor 19 has occurred. When abnormality of the yaw direction sensor 19 has not occurred, calculation of this period is completed. On the other hand, when abnormality of the yaw direction sensor 19 has occurred, the correction gain is calculated in the logic correction step. For the correction gain, as described above, a new correction gain is calculated based on the comparison result between the yaw direction value detected by the yaw direction sensor 19 when the yaw direction sensor 19 is normal and the estimate yaw direction value calculated by the yaw direction estimation part 36 when the yaw direction sensor 19 is normal. Then, when the nacelle 8 is rotating to the right, the correction gain for yaw rotation to the right stored in the memory part 34 is updated to a new correction gain for yaw rotation to the right. When the nacelle 8 is rotating to the left, the correction gain for yaw rotation to the left stored in the memory part 34 is updated to a new correction gain for yaw rotation to the left. As described above, one calculation period is completed. By repeating this calculation, it is possible to securely obtain the yaw direction value while improving estimation accuracy of the estimate yaw direction value. FIG. 6 is a time chart obtained by a simulation. As shown in the drawing, the temporal change of the yaw direction value and the estimate value yaw direction value become substantially identical to each other.

Figure 7:
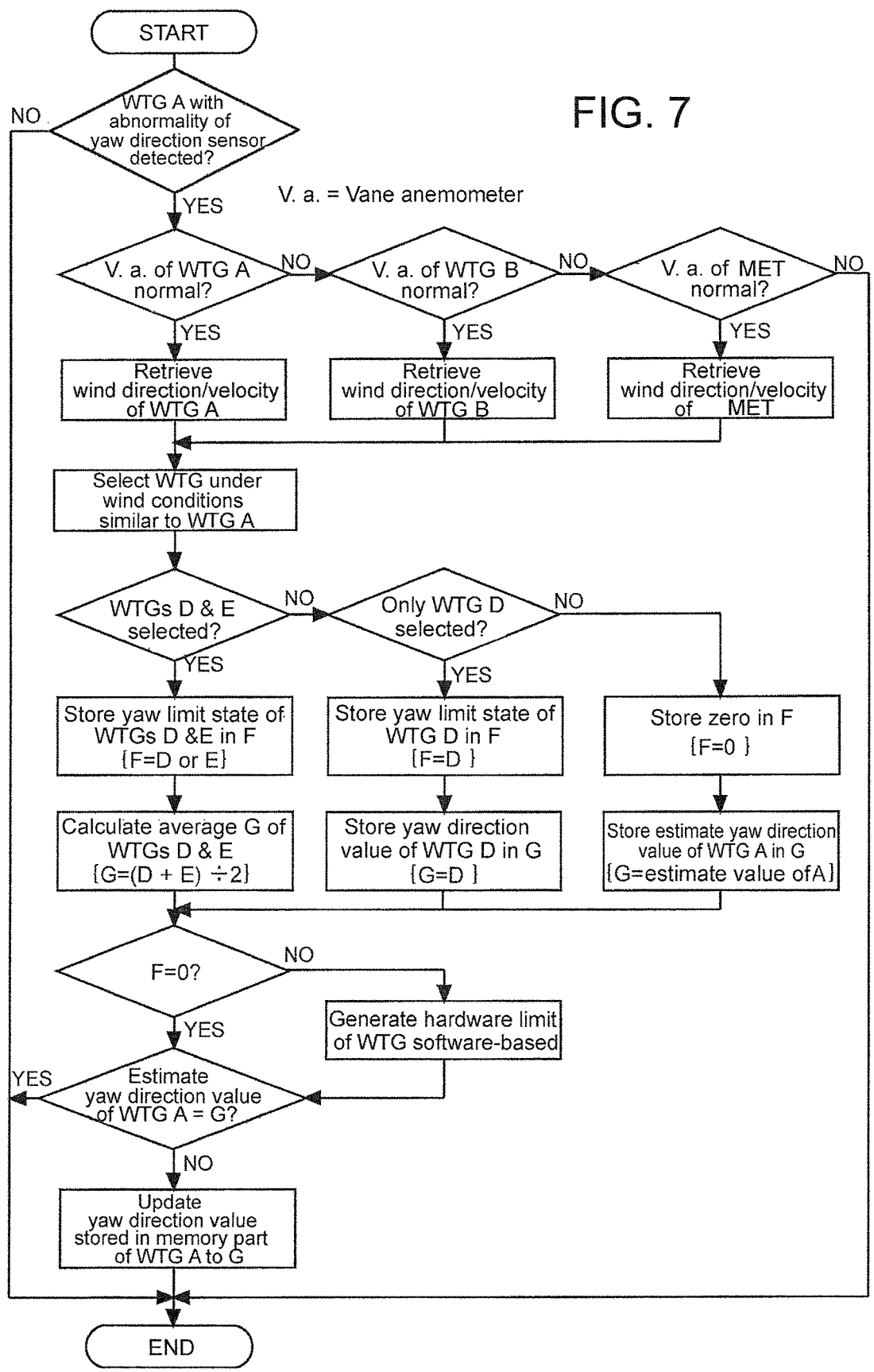
FIG. 7 is a flow chart of the procedures for calculating the estimate yaw direction value in the yaw control system of a wind turbine generator according to another embodiment.

The flow chart shown in FIG. 7 can be preferably used for the wind turbine generator 1 provided for the wind farm 100 shown in FIG. 3.

In FIG. 7, firstly, once a wind turbine generator (wind turbine) A where abnormality of the yaw direction sensor 19 has occurred is detected, it is determined whether the wind direction sensor 17 and the wind velocity sensor 18 (a vane anemometer) of the wind turbine generator A are normal. When the wind direction sensor 17 and the wind velocity sensor 18 of the wind turbine generator A are normal, the wind direction and the wind velocity of the wind turbine generator A measured by the wind direction sensor 17 and the wind velocity sensor 18 are retrieved. When the wind direction sensor 17 and the wind velocity sensor 18 of the wind turbine generator A are abnormal, it is determined whether the wind direction sensor 17 and the wind velocity sensor 18 of the other wind turbine generator B are normal. When they are normal, the wind direction and the wind velocity of the wind turbine generator B are retrieved. When the wind direction sensor 17 and the wind velocity sensor 18 of the other wind turbine generator B are abnormal, it is determined whether the wind direction sensor and the wind velocity sensor of the MET 102 (see FIG. 3) are normal. When they are normal, the wind direction and the velocity of the MET 102 are retrieved.

Then, another wind turbine generator which is under the wind conditions similar to those of the wind turbine generator A is selected. At this time, among the wind turbine generators where the wind direction sensor 17 is normal, the yaw control is in the normal mode (which is not a special mode such as the primary yaw rotation mode, for instance), and the wind direction and wind velocity are accurately measured, only a set number of such wind turbine generators are selected where the values closest to the wind turbine generator A are measured. For instance, the set number is two.

Herein, when the wind turbine generator D and the wind turbine generator E are selected, the yaw limit condition of the wind turbine generator D and the wind turbine generator E are stored in "F". Next, the average value G of the yaw direction values of the wind turbine generator D and the wind turbine generator E is calculated. Then, it is determined whether the estimate yaw direction value of the wind turbine generator A and the average value G are substantially the same. When the estimate yaw direction value of the wind turbine generator A and the average value G are not substantially the same, the yaw direction value stored in the memory part 34 of the wind turbine generator A is updated to the average value G When the estimate yaw direction value of the wind turbine generator A and the average value G are substantially the same, the yaw direction value stored in the memory part 34 of the wind turbine generator A is unchanged.

In contrast, when one wind turbine generator D is selected as another wind turbine generator under the wind conditions similar to those of the wind turbine generator A, the yaw limit condition of the wind turbine generator D is stored in "F". Next, the yaw direction value of the wind turbine generator D is stored in "G". Then, similarly to the above, it is determined whether the estimate yaw direction value of the wind turbine generator A and "G" are substantially the same. When the estimate yaw direction value of the wind turbine generator A are not substantially the same, the yaw direction value stored in the memory part 34 of the wind turbine generator A is updated to "G". When the estimate yaw direction value of the wind turbine generator A and "G" are substantially the same, the yaw direction value stored in the memory part 34 of the wind turbine generator A is unchanged.

Further, when no single wind turbine generator is selected as another wind turbine generator under the wind conditions similar to those of the wind turbine generator A, zero is stored in "F". Next, the estimate yaw direction value of the wind turbine generator A is stored in "G". Then, similarly to the above, it is determined whether the estimate yaw direction value of the wind turbine generator A and "G" are substantially the same. When the estimate yaw direction value of the wind turbine generator A and G are not substantially the same, the yaw direction value stored in the memory part 34 of the wind turbine generator A is updated to "G". When the estimate yaw direction value of the wind turbine generator A and "G" are substantially the same, the yaw direction value stored in the memory part 34 of the wind turbine generator A is unchanged.

Accordingly, it is possible to obtain the estimate yaw direction value of the nacelle 8 of the wind turbine generator 1 with high accuracy by using the data from other wind turbine generators, the MET 102, and the like.

As described above, according to the above embodiment, even when the yaw direction value of the nacelle at the current time cannot be detected, it is possible to determine the appropriate yaw rotation direction for the nacelle by using the estimate value of the yaw direction. As a result, it is possible to prevent the nacelle 8 from rotating beyond the yaw limit and to prevent the various cables extending between the nacelle 9 and the tower 9 from being twisted beyond the limit, thus enabling safe and continuous operation of the wind turbine generator 1.

Further, even for a wind turbine generator 1 with a yaw direction sensor 19 which is not multiplexed, it is possible to use the yaw direction estimation part 36 instead of the yaw direction sensor 19 for obtaining a yaw direction value upon occurrence of trouble or abnormality of the yaw direction sensor 19, and thus to attain a system with redundancy as if the yaw direction sensor 19 is multiplexed. Accordingly, it is possible to improve safety, reliability, operational rate and the like of operation of the wind turbine generator 1 without requiring cost or space for additionally providing a yaw direction sensor for 19 the purpose of multiplexing.

Embodiments of the present invention were described in detail above, but the present invention is not limited thereto, and various amendments and modifications may be implemented within a scope of the present invention.

For instance, while the embodiment illustrates the case where the yaw drive control part 32 for controlling the yaw drive mechanism is provided for the central monitoring controller 31, the yaw drive control part 32 may be provided for each of the wind turbine generators 1 (the wind turbine generators 1A to 1D shown in FIG. 3). That is, the yaw control system 30 shown in FIG. 4 may be provided for each of the wind turbine generators 1.

REFERENCE SIGNS LIST

1 Wind turbine generator
2 Blade
3 Hub
4 Rotor
5 Rotation shaft
6 Generator
8 Nacelle
10 Tower
12 Yaw rotation bearing
12A Inner race
12B Outer race
14 Nacelle rotation mechanism
15 Yaw drive mechanism
16 Yaw brake
16A Brake rotor
16B Brake caliper
17 Wind direction sensor
18 Wind velocity sensor
19 Yaw direction sensor
20 Potentiometer
21 Yaw limit sensor
30 Yaw control system
31 Central monitoring controller
32 Yaw drive control part
33 Calculation part
34 Memory part
35 Rotation amount calculation part
36 Yaw direction estimation part
37 Logic correction part
38 Estimate value correction part
100 Wind farm
108 SCADA client terminal

The invention claimed is:

1. A yaw control system for a wind turbine generator which includes a nacelle
   configured to be rotated by a yaw drive mechanism, the yaw control system comprising:
   a yaw direction sensor for detecting a yaw direction value of the nacelle at a current time; and
   a controller including a processor and a memory and configured to control the yaw drive mechanism,
   wherein the controller is configured to:
   calculate an amount of yaw rotation of the nacelle in a predetermined period of time based on a yaw rotation speed and a yaw rotation time of the nacelle; and
   calculate an estimate value of a yaw direction of the nacelle at an end point of the predetermined period by an estimate value calculation logic, based on the amount of yaw rotation in the predetermined period and the yaw direction value at a starting point of the predetermined period, and
   wherein the controller is configured to:
   when the yaw direction sensor is normal, determine a yaw rotation direction of the nacelle based on a detected result of the yaw direction value detected by the yaw direction sensor, generate a first yaw rotation command based on the determined yaw rotation direction, and send the first yaw rotation command to the yaw drive mechanism; and
   when the yaw direction sensor is abnormal, determine the yaw rotation direction of the nacelle based on the estimate value of the yaw direction, generate a second yaw rotation command based on the determined yaw rotation direction, and send the second yaw rotation command to the yaw drive mechanism.

2. The yaw control system for a wind turbine generator according to claim 1, further comprising
   a wind direction sensor for detecting a wind direction of a wind which acts on the wind turbine generator,
   wherein the controller is configured to rotate the nacelle in the yaw rotation direction based on a detected result of the wind direction sensor so that the nacelle follows the wind direction detected by the wind direction sensor.

3. The yaw control system for a wind turbine generator according to claim 1,
   wherein the controller is configured to correct the estimate value calculation logic based on a comparison result between the yaw direction value detected by the yaw direction sensor when the yaw direction sensor is normal and the estimate value of the yaw direction calculated when the yaw direction sensor is normal.

4. The yaw control system for a wind turbine generator according to claim 3,
   wherein the controller is configured is configured to:
   calculate the estimate value of the yaw direction from a correlation of the yaw direction value at the end point of the predetermined period to the yaw direction value at the starting point of the predetermined period and the amount of yaw rotation in the predetermined period, and
   correct the correlation based on the comparison result.

5. The yaw control system for a wind turbine generator according to claim 1,
   wherein the controller is configured to calculate the estimate value of the yaw direction from a correlation of the yaw direction value at the end point of the predetermined period to the yaw direction value at the starting point of the predetermined period and the amount of yaw rotation in the predetermined period, and
   the correlation is set for each yaw rotation direction of the nacelle.

6. The yaw control system for a wind turbine generator according to claim 1,
   wherein the controller is configured to, when the yaw direction sensor is abnormal, correct the estimate value based on a reference yaw direction value detected by a normal yaw direction sensor of another wind turbine generator which is under wind conditions similar to the wind turbine generator.

7. The yaw control system for a wind turbine generator according to claim 6,
   wherein the controller is configured to correct the estimate value based on the reference yaw direction value once a difference between: an amount of change of the estimate value of the yaw direction calculated in a set period; and an amount of change of the reference yaw direction value in the set period exceeds a threshold value.

8. A wind turbine generator comprising: a yaw control system according to claim 1; a yaw drive mechanism configured to be controlled by the yaw control system; and a nacelle configured to be rotated by the yaw drive mechanism.

\* \* \* \* \*